United States Patent [19]
Borchard et al.

[11] 3,953,871
[45] Apr. 27, 1976

[54] PRECISION LIGHT EXPOSURE TIMING AND SHUTTER MECHANISM FOR A WIDE RANGE OF EXPOSURE DURATIONS

[75] Inventors: David C. Borchard, Rochester; Robert E. Chan, Scottsville; Neil F. Ratzel, Rochester, all of N.Y.

[73] Assignee: The United States of America as represented by the Secretary of the Air Force, Washington, D.C.

[22] Filed: Dec. 20, 1974

[21] Appl. No.: 535,066

[52] U.S. Cl. .............................. 354/252; 352/121; 352/174; 354/254
[51] Int. Cl.² ........................................... G03B 9/08
[58] Field of Search .................. 354/250, 252, 254; 352/169, 137, 121, 174

[56] References Cited
UNITED STATES PATENTS

| | | |
|---|---|---|
| 3,397,937 | 8/1968 | Schrader .............................. 352/169 |
| 3,466,124 | 9/1969 | Geisman et al. ..................... 352/169 |
| 3,647,288 | 3/1972 | Zahradnik et al. .................. 352/174 |
| 3,762,806 | 10/1973 | Roth et al. ....................... 352/169 X |
| 3,767,298 | 10/1973 | Reinsch .............................. 352/169 |

Primary Examiner—L. T. Hix
Assistant Examiner—J. A. LaBarre
Attorney, Agent, or Firm—Joseph E. Rusz; Arsen Tashjian

[57] ABSTRACT

A mechanism which can be utilized to drive a rotating sector disc type light shutter with a high degree of precision, so as to control light exposures that are made through a stationary aperture. Unlike the prior art, this inventive mechanism can be used to extend the exposure duration range almost indefinitely. In essence, this is accomplished with the inventive mechanism by stopping the motion of the sector disc shutter, with the open portion of the sector disc aligned with the stationary aperture, and then, after a preset elapsed interval, restarting the disc to close the aperture and terminate the exposure. Also unlike the prior art, this inventive mechanism obviates the need for critical timing.

4 Claims, 2 Drawing Figures

PRECISION LIGHT EXPOSURE TIMING AND SHUTTER MECHANISM FOR A WIDE RANGE OF EXPOSURE DURATIONS

BACKGROUND OF THE INVENTION

This invention relates to a light exposure timing and shutter mechanism and, more particularly, to such a mechanism (which includes a disc or a disc-type light shutter, or the equivalent) that can be utilized to control light exposures with a high degree of precision, whereby a wide range of exposure durations can be attained.

Various configurations of the disc or disc-type shutter, such as cones and drums, and the like have been used as light shutters. The disc or disc-type shutter (hereinafter referred to generically and collectively as "disc-type") in its most simple form comprises an opaque disc fitted to (i.e., mounted on) a rotating shaft. An open sector in the disc, when aligned with another aperture (i.e., such as a stationary one), allows light to pass. If the disc is rotated at constant speed, as by a synchronous motor, each time that the open section of the disc passes the stationary aperture, light will be transmitted through the aperture and through the open sector of the shutter for a given duration of time, and that time duration will be a constant for every revolution. This is a very useful type of precision shutter for certain applications. However, for any given rotational speed and for a given stationary aperture size, there are limitations to the exposure durations that the disc can produce. Obviously, the sector cut from the disc cannot become so large that an insufficient opaque sector of the disc remains to close the light path and terminate the exposure. The limitations at the other end (i.e., the short end) of the exposure scale are not so obvious, but they are no less real. Achievable shutter efficiency, and manufacturing tolerances, are two examples.

We have invented a precision light exposure timing and shutter mechanism which, unlike the prior art, can be used to extend the exposure duration range almost indefinitely. We have, thereby, made a significant advance in the state-of-the-art. In addition, our inventive mechanism, also unlike the prior art, obviates the need for critical timing.

SUMMARY OF THE INVENTION

Our inventive mechanism permits precision light exposure timing over a wide range of exposure duration, from extremely long mode (e.g., 999 seconds) to extremely short mode (e.g., 0.01 second).

Therefore, the principal object of our invention is to teach the basic structure of our unique light exposure timing and shutter mechanism.

This principal object, as well as other equally important and related objects (such as: obviating the need for critical timing, and yet attaining the desired result), will become readily apparent after a consideration of the description of our invention and reference to the drawings.

DESCRIPTION OF THE PREFERRED EMBODIMENT

Figure 1:
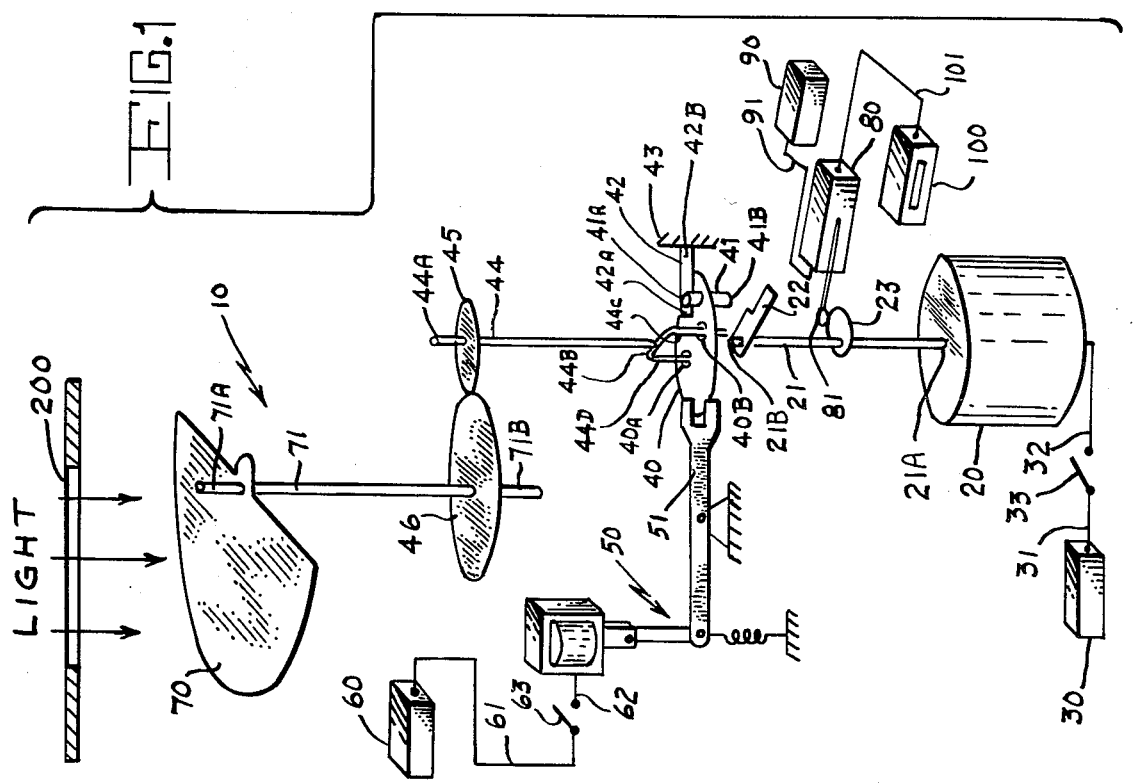
FIG. 1 is a side elevation view, in simplified schematic form, of a preferred embodiment of our invention with the disc-type shutter in the stopped, or parked, position; and, FIG. 2 is a side elevation view, also in simplified schematic form, of the preferred embodiment of our invention (which was shown in FIG. 1) with the disc-type shutter rotating.

With reference to FIG. 1 therein is shown a side elevation of a preferred embodiment 10 of our inventive mechanism. It is to be noted that the preferred embodiment is so positioned that FIG. 1 illustrates the mechanism 10 as if it were vertical. This positional layout is merely as a matter of convenience, and is not a limitation of the inventive mechanism 10. The preferred embodiment 10 can be used vertically, horizontally, or therebetween. Accordingly, such alternative positions are to be kept in mind when the relative positional relationship of the components are described (e.g., "above" should be taken to also mean, in an appropriate situation, "forward of, and vice versa"). As a related matter, it is to be noted that stationary aperture 200 is not a part of our inventive mechanism 10.

The preferred embodiment includes, in cooperative and coacting relationship, the following: a synchronous motor 20 having an output shaft 21 with a first end 21A and a second end 21B, wherein the first end 21A is connected to the synchronous motor 20 and the second end 21B is connected to a drive arm 22, with the output shaft 21 having an appropriately configurated and dimensioned cam 23 mounted thereon at a suitable location between the ends 21A and 21B of the output shaft 21; a source 30 of voltage of well-regulated frequency in electrical connection (such as by voltage source lead 31, motor lead 32, and switch 33 therebetween) with synchronous motor 20; a two-faced (i.e., two-sided), moveable, and rotatable clutch plate 40 that is positioned essentially perpendicular to, and in spaced-apart relationship to, the motor output shaft 21, with the clutch plate 40 having a pin 41 with a first end 41A and second end 41B, and with the pin 41 positioned so that the first end 41A protrudes through and out of one face of the clutch plate 40 and the second end 41B protrudes through and out of the other face of the clutch plate 40, and with the clutch plate 40 having at least two openings, such as 40A and 40B, therethrough; a stop arm 42 having a first end 42A and a second end 42B, with the first end 42A attached to an abutment 43, and with the second end 42B selectively abutable with the first end 41A of the clutch plate pin 41; a solenoid 50 having a moveable arm 51 which is engaged with the clutch plate 40; a source 60 of voltage in electrical connection (such as by voltage source lead 61, solenoid lead 62, and switch 63 therebetween); a clutch plate shaft 44 having a first end 44A and a second end 44B, with the first end 44A connected to a driver gear 45 of a preselected diameter, and with the second end 44B having a terminus with a plurality of ends, such as 44C and 44D, equal in number to, and engaged with, the plurality of openings, such as 40A and 40B, in the clutch plate 40; a driven gear 46 abutting with, and driveable by, driver gear 45, with the driven gear 46 having a diameter equal to twice the preselected diameter of driver gear 45; a shutter 70 of the sector disc-type positioned essentially above and in parallel-spaced relationship to driven gear 46; a shutter shaft 71 having a first end 71A and second end 71B, with the first end 71A connected to the shutter 70, and with the second end 71B connected to the driven gear 46; an electrical pulse switch 80 having a rotatable cam follower 81 in engagement with the motor shaft cam 23; a source 90 of voltage in electrical connection (such as by connecting wire 91) with the electrical pulse switch 80; and, an electromagnetic counter 100 of the conventional type, and preferably of the "down-counter" variety, in electrical connection (such as by connecting wire 101) with the electrical impulse switch 80.

It is here to be noted that the positional relationships of our embodiment 10, as shown in FIG. 1, is at a time when: the shutter 70 is in a stopped position; the solenoid 50 is de-energized; the clutch plate 40 is in the raised, or disengaged, position; and, the pin 41 (hereinafter referred to as the "pickup pin") is "parked" against the stop arm 42. It is also to be noted that: there is only one pickup pin 41; there is only one stationary (i.e., abutted) stop arm 42; and, therefore, there is only one "park" or stop position for the clutch plate 40. Additionally, since the clutch plate 40 is connected to and through 2:1 gears, 45 and 46, to the shutter (i.e., the sector disc) 70, said shutter 70 makes a half revolution for each full revolution of the clutch plate 40 from the park position, the shutter 70 may be stopped in either the open or the closed position. In FIG. 1, the shutter 70 is in the closed position.

Figure 2:
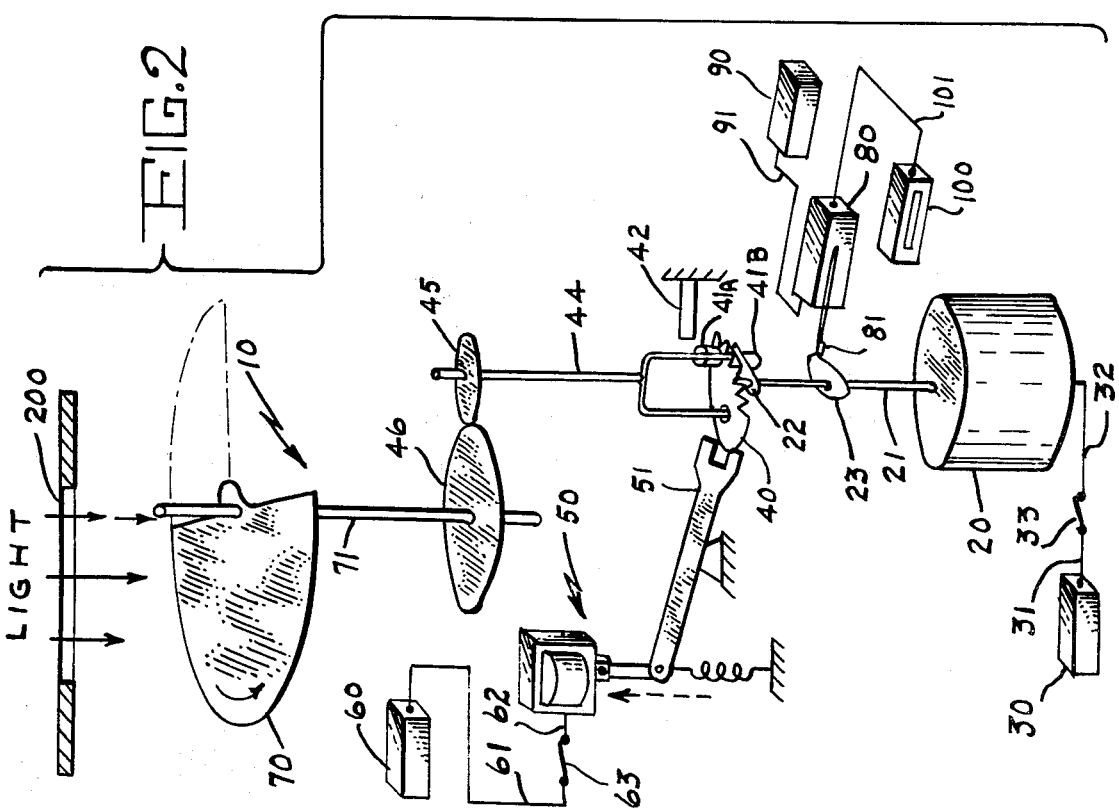

With reference to FIG. 2, therein is shown our inventive mechanism 10, with the components in positional relationship as the disc-type shutter 70 is rotating, as shown by the directional arrow thereon, and light from the stationary aperture 200 is passing through that portion of the open sector section of the shutter 70. As can easily be seen, the solenoid 50 has been actuated, resulting in solenoid arm 51 moving or pivoting downwardly, and thus moving the clutch plate 40 to the lowered or engaged position. In this position, the upper portion (i.e., the first end) 41A of the pickup pin 41 has dropped clear of the stop arm 42, thereby freeing the clutch plate 40 to rotate. The lower portion (i.e., the second end) 41B of the pickup pin 41 is now in the path of the drive arm 22; and, when the rotating drive arm 22 intercepts the pin 41, the clutch plate 40 will rotate along with it. The shutter 70 will be driven at half speed due to the 2:1 gear reduction of gears 46 and 45.

MANNER OF OPERATION OF THE PREFERRED EMBODIMENT

With reference to FIGS. 1 and 2, the following sequence of events describes how an exposure time of "N" seconds is achieved with, and by the use of, our inventive mechanism 10.

At start up, the solenoid 50 is de-energized; the clutch plate 40 is in a raised position; the pickup pin 41 is against the stop arm 42; and the synchronous motor is running, let us assume, at 60 rpm, well-regulated and unimpeded. The shutter 70 is "parked" with the opaque sector over (or across) the entire aperture 200. This is the "dark" condition. The electromagnetic counter is preset to "N" seconds, the desired exposure time (or "light" or "exposure" condition length of time). It is to be remembered that the pulse switch 80 will be actuated at each revolution of the motor output shaft 21, or once each second. Upon closure of the "initiate exposure switch" 63 by hand, or by other suitable means, such as a presetable, automatic, multi-program timing switch of any of the types that are well known in the art and are readily available commercially, the solenoid 50 is energized and the arm thereof 51 is actuated; the clutch plate 40 is lowered; and, the pickup pin 41 clears the stop arm 42 and is ready to be picked up by the drive arm 22. When the rotating drive arm 22 contacts the pickup pin 41, the clutch plate 40 is caused to rotate at the same angular velocity as the motor output shaft 21. The shutter 70 rotates at half this speed or one-half revolution per second.

Just before the clutch plate 40 makes a complete revolution, the solenoid 50 is de-energized by opening switch 63. As a result, the clutch plate 40 is raised; the pickup pin 41 becomes disengaged from contact with the drive arm 22; and, the coasting mechanism 10 comes to a stop when the pickup pin 41 contacts the stop arm 42. The shutter 70 is now parked with the open sector section over, and across, the aperture 200. This is the exposure or light condition. Meanwhile, the drive arm 42 and the pulse switch cam follower 81 have both made one revolution; the pulse switch 80 has actuated; and, the preset electromagnetic counter 100 has been reduced in count from the preset value N to N−1.

The solenoid 50 remains de-energized while the shutter 70 remains open, and the motor 20 continues to drive (i.e., rotate) the cam 23. At each revolution, or once every second in the situation assumed herein, the pulse switch 80 will reduce the counter 100 reading by one diget until the preset value of N has been reduced by N pulses to zero. At this point in time, the exposure will be approximately N−½ second. During the initial second of motor shaft 21 rotation, the shutter 70 was rotated a half revolution to open (i.e., uncover) the aperture 200. Thus, the aperture was not open (i.e., uncovered) for the entire second. The remainder of that second of exposure will be completed during the closing operation.

After the counter 100 has been reduced to zero, the solenoid 50 is again energized; the clutch plate 40 drops; the pickup pin 41 clears the stop arm 42 and waits until the drive arm 22 picks it up. The mechanism then closes the aperture 200. The solenoid 50 is de-energized just before the clutch plate 40 completes one revolution, and the pickup pin 41 comes to a stop against the stop arm 42. The total exposure is now equal to N seconds.

CONCLUSION

It is abundantly clear from the foregoing, and from the drawings herein, that the stated and desired principal object of our invention has been attained. In addition, related desirable objects also have been attained. Further, to those of ordinary skill in the art, it will be readily apparent that our inventive mechanism has distinct and significant advantages over the prior art. In essence, our mechanism obviates the need for critical timing. More specifically, the positional accuracy with which the shutter 70 stops is not critical, so long as the open sector portion of the shutter 70 is larger than the exposure aperture 200; and, similarly, the positional accuracy relative to the aperture 200, with which the mechanism re-engages to re-start the shutter 70 is not critical. This is so, because the basic timing precision is dependent upon the synchronous motor 20 speed; and, whenever the shutter 70 is being driven (i.e., rotated), its position is a function of time. This applies so long as the motor 20 operates synchronously, regardless of how long the shutter 70 has remained parked (i.e., stopped). As is well known in the art, conventional clutches can vary in pickup slippage, relay can vary in pull-in time, and switches can vary in clearance between make and break points. Our mechanism 10 negates and neutralizes the effect of these contingencies, even if they do occur, simply because it, 10 obviates the need for critical timing (and, of course, positioning), as stated hereinabove. It is only necessary to energize the clutch operating solenoid, such as 50, during the last revolution of the drive arm 23 prior to desired engagement. The shutter 70, although released from the stop, simply waits for the drive arm 23 to reach the pickup pin 41. As a related matter, we have found it beneficial (although not absolutely necessary) to incorporate some friction damping on the shutter shaft 71. This has helped to stabilize wasting, to minimize bounce following clutch engagement, and to prevent shutter creep due to vibrations while the shutter remains at a park position.

It is to be noted that, although there have been described the fundamental and unique features of our invention as applied to a particular preferred embodiment, various other embodiments, substitutions, additions, omissions, adaptations, and the like, will occur to, and can be made by, those of ordinary skill in the art, without departing from the spirit of our invention. For example, with the shutter 70 rotating at the rate of one-half revolution per second, it is obvious to one skilled in the art that exposure times much shorter than one second are achievable. This is done by replacing shutter 70, which is a 180° disc, with one having a smaller open sector portion, such as one having a 90° open sector portion (i.e., one where the disc itself is 270°) such as is shown in phantom in FIG. 2. If such a replacement were to be made, the shutter (and, more generally speaking, the inventive mechanism) would yield an exposure time of one-half second. It becomes necessary, of course, to operate the replacement shutter for one complete revolution, i.e., from parked closed to parked close. This can be arranged simply by, and through, proper switching.

Experimentally, we have been able to deliver exposure times ranging from 0.01 second to 999 seconds using the described inventive mechanism, wherein the synchronous motor used was a 60 rpm one and the shutters were of 12 inches in diameter with, of course, differently sized open sector portions. The inventive mechanism was calibrated photoelectronically and found to be accurate to better than 1 percent at all speeds and repeatable to within 1 percent over long periods of time.

What we claim is:

1. A precision light exposure timing and shutter mechanism suitable for a wide range of exposure durations, adapted for use with a stationary aperture of known size, comprising:
   a. a synchronous motor having an output shaft with a first end and a second end, wherein said first end is connected to said synchronous motor and said second end is connected to a drive arm, and wherein said output shaft has an appropriately configurated and dimensioned cam mounted thereon at a suitable location between said first and said second ends;
   b. a source of voltage of well-regulated frequency in electrical connection with said synchronous motor, and with a switch interposed between said source of voltage and said synchronous motor;
   c. a two-faced, moveable, and rotatable clutch plate positioned essentially perpendicular to, and in spaced-apart relationship to, said motor output shaft, wherein said clutch plate has a pin with a first end and a second end, with said pin positioned so that said first end protrudes through and out of one face of said clutch plate and said second end protrudes through and out of the other face of said clutch plate, said second end being selectively engageable with said drive arm, and also wherein said clutch plate has at least two openings therethrough;
   d. a stop arm having a first end and a second end, with said first end attached to an abutment, and with said second end selectively abutable with said first end of said clutch plate pin;
   e. a solenoid having a moveable arm which is engaged with said clutch plate;
   f. a voltage source in electrical connection with said solenoid, and with a switch interposed between said voltage source and said solenoid;
   g. a clutch plate shaft having a first end and a second end, with said first end connected to a driver gear of a preselected diameter, and with said second end having a terminus with a plurality of ends equal in number to, and engaged with, the said openings in said clutch plate;
   h. a driven gear abutting with, and driveable by, said driver gear, wherein said driven gear has a diameter equal to twice the preselected diameter of said driver gear;
   i. a shutter of the disc-type having an open sector and positioned essentially above said driven gear, which said open sector being of a size larger than the stationary aperture;
   j. a shutter shaft having a first end and a second end, with said first end connected to said shutter, and with said second end connected to said driven gear;
   k. an electrical pulse switch having a rotatable cam follower in engagement with said motor shaft cam;
   l. a voltage source in electrical connection with said electrical pulse switch;
   m. and, an electromagnetic counter in electrical connection with said electrical pulse switch.

2. A precision light exposure timing and shutter mechanism, as set forth in claim 1, wherein said synchronous motor rotates at the rate of 60 rotations per minute.

3. A precision light exposure timing and shutter mechanism, as set forth in claim 1, wherein said open sector portion of said disc is 180°.

4. A precision light exposure timing and shutter mechanism, as set forth in claim 1, wherein said open sector portion of said disc is 90°.

* * * * *